United States Patent
Lee et al.

(10) Patent No.: US 11,592,692 B2
(45) Date of Patent: Feb. 28, 2023

(54) FILM AND SMART WINDOW COMPRISING THE SAME

(71) Applicant: LMS Co., Ltd., Pyeongtaek-si (KR)

(72) Inventors: Dong Uk Lee, Pyeongtaek-si (KR); Ho Seong Na, Pyeongtaek-si (KR); Ji Tae Kim, Pyeongtaek-si (KR); Jong Yoon Lee, Pyeongtaek-si (KR); Sang Hyun Yoon, Pyeongtaek-si (KR); Seong Yong Yoon, Pyeongtaek-si (KR); Mi Young Park, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 95 days.

(21) Appl. No.: 17/193,990

(22) Filed: Mar. 5, 2021

(65) Prior Publication Data

US 2022/0187633 A1    Jun. 16, 2022

(30) Foreign Application Priority Data

Dec. 15, 2020  (KR) .......................... 10-2020-0174977

(51) Int. Cl.
*G02F 1/01* (2006.01)
*E06B 9/24* (2006.01)

(52) U.S. Cl.
CPC .............. *G02F 1/0147* (2013.01); *E06B 9/24* (2013.01); *E06B 2009/2417* (2013.01); *G02F 2202/36* (2013.01); *G02F 2203/055* (2013.01); *G02F 2203/11* (2013.01)

(58) Field of Classification Search
CPC ..... E06B 2009/2464; E06B 2009/2405; E06B 3/6715; E06B 2009/2417; E06B 9/24; G02B 5/208; G02F 2203/11; G02F 2203/055; G02F 2202/36; G02F 1/0147
See application file for complete search history.

(56) References Cited

U.S. PATENT DOCUMENTS

| | | | |
|---|---|---|---|
| 2007/0054223 A1 | 3/2007 | Kang et al. | |
| 2010/0309539 A1* | 12/2010 | Kaye | G02F 1/174 977/773 |
| 2022/0089835 A1* | 3/2022 | Yang | C08J 3/28 |

FOREIGN PATENT DOCUMENTS

| | | |
|---|---|---|
| JP | 2014-085408 A | 5/2014 |
| KR | 10-2007-0027293 A | 3/2007 |
| KR | 101319263 B1 | 10/2013 |
| KR | 10-2146390 B1 | 8/2020 |

OTHER PUBLICATIONS

Korean Office Action dated Aug. 8, 2022 issued in counterpart Patent Application No. 10-2020-0174977 (4 pages).

* cited by examiner

*Primary Examiner* — Mariam Qureshi
(74) *Attorney, Agent, or Firm* — Polsinelli PC (57) ABSTRACT

A film, in which a phase transition material is not applied on an entire surface thereof and a pattern form is provided so that the aesthetically superior film of which a color is not cloudy but bright may be obtained and which has a high visible light transmittance as well as superior thermochromic properties, and a smart window including the same.

19 Claims, 1 Drawing Sheet

FILM AND SMART WINDOW COMPRISING THE SAME

CROSS-REFERENCE TO RELATED APPLICATION

This application claims priority to and the benefit of Korean Patent Application No. 10-2020-0174977, filed on Dec. 15, 2020, which is incorporated herein by reference in its entirety.

BACKGROUND

Field of the Disclosure

The present disclosure relates to a film and a smart window including the same.

Description of the Background

Recently, various products are being released to save energy. Among them, smart windows configured to adjust an infrared light transmittance for sunlight introduced from the outside are attracting attention.

Vanadium dioxide ($VO_2$) nanoparticles are a typical compound applied to the smart windows. A phase of the vanadium dioxide ($VO_2$) nanoparticles having an insulation property of a monoclinic system is transitioned to a metal phase at a temperature higher than a phase transition temperature (in other words, critical temperature). This is referred to as a metal-insulator transition (MIT) property and is a reversible reaction.

The vanadium dioxide ($VO_2$) nanoparticles have little change in transmittance according to a temperature in a visible light range (wavelength band of about 400 to 700 nm). However, according to the MIT property, the vanadium dioxide ($VO_2$) nanoparticles have a high infrared light transmittance at a temperature lower than the phase transition temperature in an infrared light range (wavelength band of about 700 to 2,500 nm) and a low infrared light transmittance at a temperature higher than the phase transition temperature.

In the smart window to which the vanadium dioxide ($VO_2$) nanoparticles are applied, a phase transition temperature may be set to be higher than the temperature in summer and lower than the temperature in winter. Accordingly, it is possible to efficiently use energy by blocking infrared light increasing an indoor temperature in summer and allowing the infrared light to pass therethrough in winter.

A film coated with the vanadium dioxide ($VO_2$) nanoparticles is used in the conventional smart window to which the vanadium dioxide ($VO_2$) nanoparticles are applied. In order to apply a roll-to-roll process, a front surface of a base is coated with a low concentration vanadium dioxide ($VO_2$) nanoparticle solution with a thin thickness of about several hundred nanometers.

For example, in Patent Document 1, a graphene-based $VO_2$ stacked structure for a smart window is disclosed which includes at least one or more graphene layers, a vanadium dioxide layer formed on an upper surface of the graphene layer, and one or more functional layers formed on at least one surface of the vanadium dioxide.

However, in the case in which the front surface of the base is coated with the vanadium dioxide ($VO_2$) nanoparticle solution to form a thin film layer, a color thereof is cloudy, which is aesthetically unfavorable. In addition, in this case, there is a problem in that a high transmittance for visible light may not be secured.

In the case in which the front surface of the base is coated with the low concentration vanadium dioxide ($VO_2$) nanoparticle solution with a thin thickness of about several hundred nanometers, an encapsulation layer, which is relatively thick, is necessary because there is a problem of being oxidized into vanadium pentoxide ($V_2O_5$), trivanadium pentoxide ($V_3O_8$), and the like which do not have thermochromic properties due to oxygen in the atmosphere. However, in the case in which the thick encapsulation layer is used, oxidation of vanadium dioxide ($VO_2$) may be prevented, but there are problems in that a manufacturing cost is increased, and a transmittance for visible light is reduced.

SUMMARY

Accordingly, the present disclosure is directed to providing a film and a smart window including the same.

The present disclosure is directed to providing a film allowing low-cost manufacturing and mass production and having predetermined thermochromic properties, and a smart window including the same.

The present disclosure is directed to providing a film having a pattern form without coating an entire surface thereof with a phase transition material so that the aesthetically superior film, of which a color is not cloudy but bright, and a smart window including the same.

The present disclosure is directed to providing a film having a high visible light transmittance and also having superior thermochromic properties, and a smart window including the same.

According to an aspect of the present disclosure, there is provided a film including a base layer including one or more concave portions forming lines on a surface of the base layer, and a phase transition material which is present in the concave portions of the base layer, wherein the phase transition material is a material of which an infrared light transmittance is changed by heat, a transmittance $T_{550}$ for light with a wavelength of 550 nm at a temperature of 25° C. is 57.5% or more, and an absolute value of $\Delta T_{2000}$ according to Equation 1 below is 10% or more. In this case, Equation 1 is defined as $\Delta T_{2000} = T_{2000.L} - T_{2000.H}$, and in Equation 1, $T_{2000.L}$ is a transmittance of the film for light with a wavelength of 2,000 nm at a temperature of 25° C., and $T_{2000.H}$ is a transmittance of the film for light with a wavelength of 2,000 nm at a temperature of 90° C.

According to another aspect of the present disclosure, there is provided a smart window including a glass base and the film according to the present disclosure.

BRIEF DESCRIPTION OF THE DRAWINGS

The above features and advantages of the present disclosure will become more apparent to those of ordinary skill in the art by describing exemplary aspects thereof in detail with reference to the accompanying drawings, in which.

DETAILED DESCRIPTION

The term "visible light" used in the present disclosure denotes light with a wavelength of about 400 nm to 700 nm.

The term "infrared light" used in the present disclosure denotes light with a wavelength of about 700 nm to 2,500 nm.

The term "thermochromic" used in the present disclosure denotes that properties change according to a temperature and, particularly, may denote that a transmittance for light changes according to a temperature.

The term "room temperature" used in the present disclosure denotes a natural temperature which is not artificially increased or decreased and may be about 10° C. to 30° C. according to the season.

The term "ambient condition" used in the present disclosure denotes a natural pressure which is not artificially increased or decreased and may be a pressure of about 0.8 to 1.2 atm according to altitude above sea level and atmospheric conditions.

The term "visible light transmittance" or "high visible light transmittance" used in the present disclosure may denote that a transmittance $T_{550}$ for light with a wavelength of 550 is 57.5% or more. In addition, according to another aspect, the term "visible light transmittance" or "high visible light transmittance" may denote that a transmittance $T_{550}$ for light with a wavelength of 550 nm is 60% or more, 65% or more, 70% or more, 75% or more, 80%, or 85% or more.

The term "superior thermochromic properties" used in the present disclosure may denote that an absolute value of $\Delta T_{2000}$ according to Equation 1 is 10% or more. In another aspect, the term "superior thermochromic properties" may denote that an absolute value thereof is 12% or more, 14% or more, 16% or more, 18% or more, or 20% or more.

$$\Delta T_{2000}=T_{2000.L}-T_{2000.H} \qquad \text{[Equation 1]}$$

In Equation 1, $T_{2000.L}$ is a transmittance of the film for light with a wavelength of 2,000 nm at a temperature of 25° C., and $T_{2000.H}$ is a transmittance of the film for light with a wavelength of 2,000 nm at a temperature of 90° C.

The term "same" used in the present disclosure may denote that an extent is physically and completely the same and also corresponds to an error range so that it is substantially the same.

The term "a distance between two lines adjacent to each other" used in the present disclosure may denote a distance between a reference line and other line nearest to the reference line.

The term "lines formed to not intersect each other" used in the present disclosure may denote lines forming so as not to form a point of contact among the lines in the film.

Figure 1:
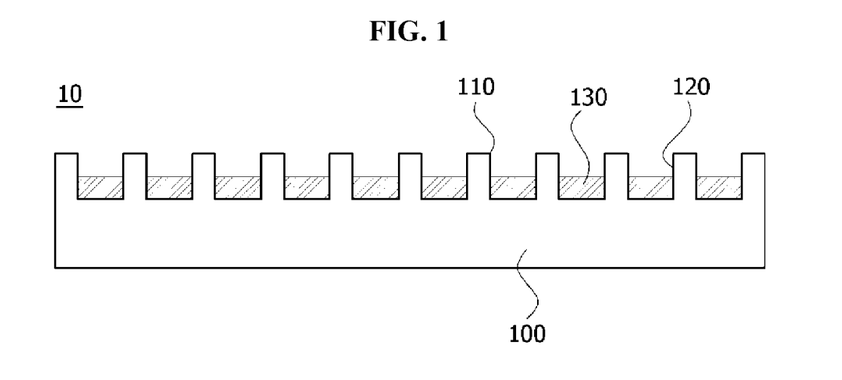
FIG. 1 is a view illustrating a structure of a film according to one aspect of the present disclosure film.

FIG. 1 is a view illustrating a structure of a film according to one aspect of the present disclosure film. A film 10 according to one aspect of the present disclosure may include a base layer 100 having one or more concave portions 120 forming lines 110 on a surface thereof.

The base layer 100 may be a support of the film and have visible light transmittance and/or transparency. In order to have such properties, the base layer 100 may be formed of a material having visible light transmittance and/or transparency.

The base layer 100 may be formed of a material independently having visible light transmittance and/or transparency and may include, for example, one or more selected from the group consisting of cyclic olefin resin, polyimide resin, polycarbonate resin, polyamide resin, polyalkylene terephthalate resin (such as polyethylene terephthalate resin and polybutylene terephthalate resin), acrylic resin, and epoxy resin but is not limited thereto.

The base layer 100 may be independently formed through a melt molding or casting molding process. In addition, as necessary, the base layer 100 may be coated with a coating agent such as an antireflection agent, a hard coating agent, and an antistatic agent after molding. Specifically, the base layer 100 may be formed by performing a melt molding process, such as an injection molding, melt extrusion molding, or blow molding process, on pellets formed of a material having visible light transmittance and/or transparency. In addition, the base layer 100 may also be formed by casting a material having visible light transmittance and/or transparency on a proper base and curing and drying the base casted with the material.

Since the film 10 includes the base layer 100 having the visible light transmittance and/or transparency, an entirety of the film 10 may have a bright color. In addition, the film 10 may secure superior optical properties such as transmittance for visible light.

The film 10 may include a phase transition material 130 disposed in the concave portions 120 of the base layer 100. The phase transition material 130 is a material of which an infrared light transmittance is changed by heat.

The film 10 may have superior thermochromic properties due to the phase transition material 130. For example, it may be denoted that an absolute value of $\Delta T_{2000}$ according to Equation 1 below is 10% or more. In another aspect, it may be denoted that an absolute value thereof is 12% or more, 14% or more, 16% or more, 18% or more, or 20% or more.

$$\Delta T_{2000}=T_{2000.L}-T_{2000.H} \qquad \text{[Equation 1]}$$

In Equation 1, $T_{2000.L}$ is a transmittance of the film for light with a wavelength of 2,000 nm at a temperature of 25° C., and $T_{2000.H}$ is a transmittance of the film for light with a wavelength of 2,000 nm at a temperature of 90° C.

The phase transition material 130 may include vanadium dioxide ($VO_2$) particles. As described above, the vanadium dioxide ($VO_2$) particles have little change in transmittance according to a temperature in a visible light range (wavelength band of about 400 to 700 nm) but have a high infrared light transmittance in an infrared light range (wavelength band is about 700 to 2,500 nm) at a temperature less than or equal to a phase transition temperature according to a metal-insulator transition (MIT) property thereof and have a low infrared light transmittance at a temperature greater than the phase transition temperature.

Accordingly, as the film 10 is set using the vanadium dioxide ($VO_2$) particles so that the phase transition temperature is higher than the temperature in summer and lower than the temperature in winter, the film 10 may block infrared light which increases an indoor temperature in summer and allow the infrared light to pass therethrough in winter.

An average particle size of the vanadium dioxide ($VO_2$) particles included in the phase transition material 130 may be 40 nm or more, 42 nm or more, 44 nm or more, 46 nm or more, or 48 nm or more, and in another aspect, an average particle size may be 70 nm or less, 68 nm or less, 66 nm or less, 64 nm or less, or 62 nm or less.

In this case, the average particle size of the vanadium dioxide ($VO_2$) particles is a so called D50 particle size (median particle size) and may denote a particle diameter at 50% of a cumulative volume in a particle size distribution. That is, when the particle size distribution is obtained based on a volume, and a cumulative curve in which a total volume is 100% is obtained, a diameter of a particle at a point at which a cumulative value reaches 50% in the cumulative curve may be referred to as an average particle size. The D50 particle size may be measured in a laser diffraction manner.

In the case in which an average particle size of the vanadium dioxide ($VO_2$) particles satisfies the above-described range, superior thermochromic properties may be secured.

The phase transition material 130 may be formed of a thermochromic slurry including the vanadium dioxide ($VO_2$) particles and a polar solvent. In this case, the thermochromic slurry may include the vanadium dioxide ($VO_2$) particles at 10 wt % or more or 15 wt % or more based on a total weight percentage of the slurry, and in another aspect, a thermochromic slurry may include vanadium dioxide ($VO_2$) particles at 40 wt % or less, 35 wt % or less, 30 wt % or less, or 25 wt % or less.

In the case in which a content of the vanadium dioxide ($VO_2$) particles satisfies the above-described range, the film 10 according to one aspect of the present disclosure may have visible light transmittance and superior thermochromic properties for the infrared light.

The phase transition material 130 may additionally include a dispersion polymer. A nonionic polymer which does not have a physical and chemical relationship with the vanadium dioxide ($VO_2$) particles may be used as the dispersion polymer.

The dispersion polymer included in the phase transition material 130 may include, for example, one or more selected from the group consisting of polymethylmethacrylate (PMMA), polystyrene (PS), polycaprolactone (PCL), polyacrylonitrile (PAN), polyvinylidene fluoride (PVDF), polyvinylpyrrolidone (PVP), and polyvinyl alcohol (PVA) but is not particularly limited thereto.

A transmittance $T_{550}$ of the film 10 according to one aspect of the present disclosure for light with a wavelength of 550 nm at a temperature of 25° C. is 57.5% or more, and an absolute value of $\Delta T_{2000}$ according to Equation 1 below may satisfy 10% or more.

$$\Delta T_{2000} = T_{2000,L} - T_{2000,H} \quad \text{[Equation 1]}$$

In Equation 1, $T_{2000,L}$ is a transmittance of the film for light with a wavelength of 2,000 nm at a temperature of 25° C., and $T_{2000,H}$ is a transmittance of the film for light with a wavelength of 2,000 nm at a temperature of 90° C.

In another aspect, a transmittance $T_{550}$ of a film 10 for light with a wavelength of 550 nm is 60% or more, 65% or more, 70% or more, 75% or more, 80% or more, or 85% or more, and it may mean that an absolute value of $\Delta T_{2000}$ according to Equation 1 is 12% or more, 14% or more, 16% or more, 18% or more, or 20% or more.

In addition, in the film 10 according to one aspect of the present disclosure, the sum of the transmittance $T_{550}$ for light with a wavelength of 550 nm at a temperature of 25° C. and $\Delta T_{2000}$ according to Equation 1 may satisfy 60% or more.

In another aspect, the sum of a transmittance $T_{550}$ for light with a wavelength of 550 nm at a temperature of 25° C. and $\Delta T_{2000}$ according to Equation 1 may satisfy 65% or more, 70% or more, 75% or more, or 80% or more.

In addition, in the film 10 according to one aspect of the present disclosure, an absolute value of $\Delta T_{550}$ according to Equation 2 below satisfies 5% or less, and in another aspect, an absolute value thereof may satisfy 4% or less, 3% or less, or 2% or less.

$$\Delta T_{550} = T_{550,L} - T_{550,H} \quad \text{[Equation 2]}$$

In Equation 2, $T_{550,L}$ is a transmittance of the film for light with a wavelength of 550 nm at a temperature of 25° C., and $T_{550,H}$ is a transmittance of the film for light with a wavelength of 550 nm at a temperature of 90° C.

In addition, in the film 10 according to one aspect of the present disclosure, an absolute value of $\Delta TA_{550,30}$ according to Equation 3 below is 1.5% or less, and an absolute value of $\Delta TA_{2000,30}$ according to Equation 4 below may satisfy 2% or less.

$$\Delta TA_{550,30} = T_{550,A} - T_{550,B} \quad \text{[Equation 3]}$$

In Equation 3, $T_{550,A}$ is a transmittance of the film for light with a wavelength of 550 nm at a temperature of 25° C. after the film is maintained for 30 days in the ambient condition at a temperature of 25° C., and $T_{550,B}$ is a transmittance of the film for light with a wavelength of 550 nm at a temperature of 25° C. before the film is maintained for 30 days in the ambient condition of the temperature of 25° C.

$$\Delta TA_{2000,30} = \Delta T_{2000,A} - \Delta T_{2000,B} \quad \text{[Equation 4]}$$

In Equation 4, $\Delta T_{2000,A}$ is an absolute value of $\Delta T_{2000}$ calculated according to Equation 1 below after the film is maintained for 30 days in the ambient condition at a temperature of 25° C., and $\Delta T_{2000,B}$ is an absolute value of $\Delta T_{2000}$ calculated according to Equation 1 below before the film is maintained for 30 days in the ambient condition of the temperature of 25° C.

$$\Delta T_{2000} = T_{2000,L} - T_{2000,H} \quad \text{[Equation 1]}$$

In Equation 1, $T_{2000,L}$ is a transmittance of the film for light with a wavelength of 2,000 nm at a temperature of 25° C., and $T_{2000,H}$ is a transmittance of the film for light with a wavelength of 2,000 nm at a temperature of 90° C.

In another aspect, in a film 10, an absolute value of $\Delta TA_{550,30}$ according to Equation 3 is 1.45%, 1.4%, 1.35%, 1.3%, 1.25%, 1.2%, 1.15%, 1.1%, or 1.05% or less, and an absolute value of $\Delta TA_{2000,30}$ according to Equation 4 below may satisfy 1.9% or less, 1.8% or less, 1.7% or less, 1.6% or less, or 1.5% or less.

In short, in the film 10 according to one aspect of the present disclosure, the transmittance $T_{550}$ for light with a wavelength of 550 nm at a temperature of 25° C. may satisfy 57.5% or more. In addition, in the film 10, the absolute value of $\Delta T_{2000}$ according to Equation 1 may be 10% or more. In addition, in the film 10, the sum of the transmittance $T_{550}$ for light with a wavelength of 550 nm at a temperature of 25° C. and $\Delta T_{2000}$ according to Equation 1 may satisfy 60% or more. In addition, in the film 10, the absolute value of $\Delta T_{550}$ according to Equation 2 may satisfy 5% or less. In addition, in the film 10, the absolute value of $\Delta TA_{550,30}$ according to Equation 3 may satisfy 1.5% or less. In addition, in the film 10, the absolute value of $\Delta TA_{2000,30}$ according to Equation 4 may satisfy 2% or less.

A pattern formed with two or more lines 110 on a surface of the base layer 100 may be formed on the concave portions 120 of the film 10 according to one aspect of the present disclosure.

A ratio W/P of an average width W of the concave portions 120 to an average distance P between two lines adjacent to each other is 1.5 or more, 1.6 or more, 1.7 or more, 1.8 or more, 1.9 or more, or 2 or more, and in another aspect, the ratio W/P may be 6.5 or less, 6.4 or less, 6.3 or less, 6.2 or less, 6.1 or less, or 6 or less. In the case in which the ratio W/P satisfies the above-described range, in the film 10, the transmittance $T_{550}$ for light with a wavelength of 550 nm at a temperature of 25° C. may satisfy 57.5% or more, the absolute value of $\Delta T_{550}$ according to Equation 2 satisfies 5% or less, and the absolute value of $\Delta TA_{550,30}$ according to Equation 3 may satisfy 1.5% or less.

In this case, in a case in which widths W of the concave portions 120 are equal, the average width W may be the width of one concave portion 120, and in a case in which the widths W of the concave portions 120 are different, the average width W may be an arithmetic mean value of a longest width and a shortest width.

In addition, in a case in which distances between two lines adjacent to each other are equal, the average distance P may be the distance, and in a case in which the distances P are different, the average distance P may be an arithmetic mean value of a longest distance between two lines adjacent to each other and a shortest distance value therebetween.

In the case in which the plurality of concave portions 120 are disposed, the widths W of the plurality of concave portions 120 may have independent lengths. For example, all of the widths W of the plurality of concave portions 120 may be equal or different.

In addition, in a case in which there are a plurality of gaps, each of which is disposed between two lines 110 adjacent to each other (that is, three of more lines 110 are disposed), the distances P between the two lines 110 adjacent to each other may be different, which is similar to the case in which the plurality of concave portions 120 are disposed.

The average width W of the concave portions 120 may be 10 μm or more, 11 μm or more, 12 μm or more, 13 μm or more, 14 μm or more, or 14.5 μm or more, and in another aspect, the average width W may be 20 μm or less, 19 μm or less, 18 μm or less, 17 μm or less, 16 μm or less, or 15 μm or less.

The average distance P between two lines may be 1 μm or more, 1.25 μm or more, 1.5 μm or more, 1.75 μm or more, 2 μm or more, 2.25 μm or more, 2.5 μm or more, or 2.75 μm or more, and in another aspect, the average distance P may be 10 μm or less, 8 μm or less, 6 μm or less, 5 μm or less, 4 μm or less, or 3.25 μm or less.

In the case in which the average width W of the concave portions 120 and/or the average distance P between two lines adjacent to each other satisfies the above-described range, the aesthetically superior film 10, of which a color is not cloudy but bright, may be obtained.

An average height H of the concave portions 120 may be 10 μm or more, 11 μm or more, 12 μm or more, 13 μm or more, 14 μm or more, or 14.5 μm or more, and in another aspect, the average height H may be 20 μm or less, 19 μm or less, 18 μm or less, 17 μm or less, 16 μm or less, or 15 μm or less.

A ratio H/W of the average height H of the concave portions 120 to the average width W thereof may be 0.8 or more, 1 or more, 1.25 or more, 1.5 or more, 1.75 or more, 2 or more, 2.25 or more, 2.5 or more, 2.75 or more, or 3 or more, and in another aspect, the ratio H/W may be 5 or less, 4.75 or less, 4.5 or less, 4.25 or less, 4 or less, 3.75 or less, or 3.5 or less. In the case in which the ratio H/W satisfies the above-described range, the phase transition material 130, which will be described below, may be easily injected into the concave portions 120 so that the film may be easily manufactured and mass production of the film is possible.

A volume ($mm^3$) of a space formed by the concave portions 120 per unit area (1 $mm^2$) of the surface of the base layer 100 may be in the range of $5 \times 10^{-4}$ to $1 \times 10^{-4}$ $mm^3$ and may be in the range of $6 \times 10^{-4}$ to $8.5 \times 10^{-3}$ $mm^3$. In the case in which the volume of the space formed by the concave portion 120 per unit area of the surface of the base layer 100 satisfies the above-described range, in the film 10, the transmittance $T_{550}$ for light with a wavelength of 550 nm at a temperature of 25° C. may satisfy 57.5% or more, the absolute value of $\Delta T_{550}$ according to Equation 2 may satisfy 5% or less, and the absolute value of $\Delta TA_{550,30}$ according to Equation 3 may satisfy 1.5% or less.

Two or more lines 110 formed by the concave portions 120 may be formed so that the lines 110 do not intersect each other. In the case in which two or more lines 110 are formed so that the lines do not intersect each other, since a phenomenon in which the phase transition material 130, which should fill the concave portions 120, does not completely fill the concave portions 120, is prevented, a volume ratio of the phase transition material 130 occupying the concave portion 120, which will be described below, to the concave portion 120 may be satisfied.

The phase transition material 130 may occupy the concave portions 120 so that a volume of the phase transition material 130 is 5% or more, 8% or more, 9% or more, 10% or more, 11% or more, or 12% or more of a total volume of the concave portions 120, and in another aspect, a phase transition material 130 may occupy a concave portions 120 so that a volume of the phase transition material 130 is 18% or less, 17% or less, 16% or less, 15% or less, or 14% or less of a total volume of the concave portions 120. In the case in which the phase transition material 130 occupies the concave portions 120 in the above-described range of the total volume of the concave portions 120, in the film 10, the absolute value of $\Delta T_{2000}$ according to Equation 1 may satisfy 10% or more, the sum of the transmittance $T_{550}$ for light with a wavelength of 550 nm at a temperature of 25° C. and $\Delta T_{2000}$ according to the Equation 1 may satisfy 60% or more, and the absolute value of $\Delta TA_{2000,30}$ according to Equation 4 may satisfy 2% or less.

Figure 2:
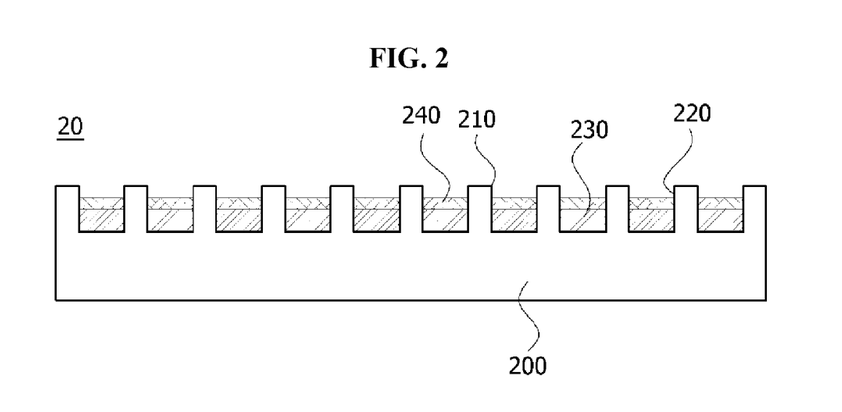
FIG. 2 is a view illustrating a structure of a film in which an encapsulation layer is additionally formed according to another aspect of the present disclosure.

FIG. 2 is a view illustrating a structure of a film according to another aspect of the present disclosure. A film 20 according to one aspect of the present disclosure may include a base layer 200 having one or more concave portions 220 forming lines 210 on a surface of the base layer 200 and additionally include an encapsulation layer 240 which prevents a phase transition material 230 from being in contact with the atmosphere in the concave portions 220.

Since descriptions of the base layer 200, the lines 210, the concave portions 220, and the phase transition material 230 of the film 20 are the same as those of the above-described components, the detailed descriptions thereof will be omitted.

Some portions of the phase transition material 230 may be prevented from being in contact with the atmosphere by the base layer 200. However, other positions of the phase transition material 230 may still be exposed to the atmosphere, and the other portions, which may be exposed to the atmosphere, of the phase transition material 230 may be prevented from being exposed to the atmosphere by the encapsulation layer 240.

Specifically, the phase transition material 230 may react with oxygen in the atmosphere to be oxidized. In the case in which the phase transition material 230 is oxidized, thermochromic properties may be removed. Accordingly, the phase transition material 230 needs to be prevented from being oxidized by blocking portions, which are in contact with the atmosphere, of the phase transition material 230 using the encapsulation layer 240.

Conventionally, since a structure, in which a pattern is formed, like the film 20 according to one aspect of the present disclosure is not used, and a thin phase transition material layer is used to coat a front surface of a base, there is a problem of being susceptible to oxidation. In order to solve such a problem, a thick encapsulation layer is stacked on the front surface of the base coated with the thin phase transition material layer. However, since the encapsulation layer is thick, a visible light transmittance is lowered, and thus the film has a problem in that a color thereof is cloudy.

As described above, in the film 20 according to one aspect of the present disclosure, the phase transition material 230 may occupy 5 to 18% of the concave portion 220 based on a volume, which is greater than a range of the conventional case, to increase resistance against oxidation when compared to the conventional case.

Accordingly, a thickness of the encapsulation layer 240 may be decreased as compared to the conventional case, and thus the film 20 may preserve a visible light transmittance and appear generally bright so that aesthetics may be secured.

In the film 20 according to one aspect of the present disclosure, a transmittance $T_{550}$ for light with a wavelength of 550 nm at a temperature of 25° C. may satisfy 57.5% or more. In addition, in the film 20, an absolute value of $\Delta T_{2000}$ according to Equation 1 may be 10% or more. In addition, in the film 20, the sum of the transmittance $T_{550}$ for light with a wavelength of 550 nm at a temperature of 25° C. and $\Delta T_{2000}$ according to Equation 1 may satisfy 60% or more. In addition, in the film 20, an absolute value of $\Delta T_{550}$ according to Equation 2 may satisfy 5% or less. In addition, in the film 20, an absolute value of $\Delta TA_{550,30}$ according to Equation 3 may satisfy 1.5% or less. In addition, in the film 20, the absolute value of $\Delta TA_{2000,30}$ according to Equation 4 may satisfy 2% or less.

A pattern formed by two or more lines 210 on a surface of the base layer 200 may be formed on the concave portions 220 of the film 20 according to one aspect of the present disclosure.

A ratio W/P of an average width W of the concave portions 220 to an average distance P between two lines, an average width W of the concave portions 220, the average distance P between two lines adjacent to each other, an average height H of the concave portions 220, a ratio H/W of the average height H and the average width W of the concave portions 220, a volume (mm³) of a space formed by the concave portions 220 per unit area (1 mm²) of the surface of the base layer 200, and a volume ratio of a volume of the phase transition material 230 occupying the concave portion 220 to a total volume of the concave portion 220 may satisfy value ranges which are equal to those of the film 10 according to the aspect of the present disclosure.

In addition, in the film 20, two or more lines 210 formed by the concave portions 220 may be formed so that the lines 210 do not intersect each other.

The film 20 according to one aspect of the present disclosure may further include the encapsulation layer 240 so that an absolute value of $\Delta TA_{550,60}$ according to Equation 5 below may satisfy 0.5% or less, and an absolute value of $\Delta TA_{2000,60}$ according to Equation 6 below may satisfy 0.3% or less.

$$\Delta TA_{550,60} = T_{550.C} - T_{550.D} \quad \text{[Equation 5]}$$

In Equation 5, $T_{550.0}$ is a transmittance of the film for light with a wavelength of 550 nm at a temperature of 25° C. after the film 20 is maintained for 60 days in the ambient condition at a temperature of 25° C., and $T_{550.D}$ is a transmittance of the film 20 for light with a wavelength of 550 nm at a temperature of 25° C. before the film 20 is maintained for 60 days in the ambient condition at a temperature of 25° C.

$$\Delta TA_{2000,60} = \Delta T_{2000.C} - \Delta T_{2000.D} \quad \text{[Equation 6]}$$

In Equation 6, $\Delta T_{2000.C}$ is an absolute value of $\Delta T_{2000}$ calculated according to Equation 1 below after the film 20 is maintained for 60 days in the ambient condition at a temperature of 25° C., and $\Delta T_{2000.D}$ is an absolute value of $\Delta T_{2000}$ calculated according to Equation 1 below before the film 20 is maintained for 60 days in the ambient condition at a temperature of 25° C.

$$\Delta T_{2000} = T_{2000.L} - T_{2000.H} \quad \text{[Equation 1]}$$

In Equation 1, $T_{2000.L}$ is a transmittance of the film 20 for light with a wavelength of 2000 nm at a temperature of 25° C., and $T_{2000.H}$ is a transmittance of the film 20 for light with a wavelength of 2000 nm at a temperature of 90° C.

In another aspect, in a film 20, an absolute value of $\Delta TA_{550,60}$ according to Equation 5 may be 0.45% or less, 0.4% or less, 0.35% or less, 0.3% or less, or 0.25% or less. In addition, in the film 20, an absolute value of $\Delta TA_{2000,60}$ according to the Equation 6 may be 0.25% or less, 0.2% or less, 0.15% or less, or 0.1% or less.

The encapsulation layer 240 may occupy the concave portion 220 so that a volume of the encapsulation layer 240 is 35% or more, 37.5% or more, 40% or more, 42.5% or more, or 45% or more of a total volume of the concave portions 220, and in another aspect, a volume of an encapsulation layer 240 may be 55% or less, 52.5% or less, 50% or less, or 47.5% or less of a total volume of concave portions 220. In the case in which the encapsulation layer 240 occupies the concave portions 220 in the above-described range of the total volume of the concave portions 220, in the film 20, the absolute value of $\Delta TA_{550,60}$ according to Equation 5 may satisfy 0.5% or less, and the absolute value of $\Delta TA_{2000,60}$ according to Equation 6 may satisfy 0.3% or less.

The encapsulation layer 240 may include a resin for protecting the phase transition material 230 in the concave portions 220, and polyurethane acrylate or the like may be used as the resin. For example, the resin may be formed of a monomer which is one selected from the group consisting of urethane acrylate oligomer, acrylate, and mixtures thereof (for example, a mixture of urethane acrylate oligomer and methyl (meth)acrylate in a ratio of 2:1).

The encapsulation layer 240 may additionally include metal oxide particles to block ultraviolet light and preserve a visible light transmittance. The metal oxide particles may include one or more selected from the group consisting of titanium oxide, zinc oxide, zirconium oxide, and iron oxide.

The encapsulation layer 240 may include the metal oxide particles at 10 wt % or less of a weight percentage of the resin, and in another aspect, an encapsulation layer 240 may include metal oxide particles at 7 wt % or less, 5 wt % or less, 3 wt % or less, or 1 wt % or less of a weight percentage of a resin. In the case in which a content of the metal oxide particles satisfies the above-described range, since a decrease in transmittance of the film 20 for an entire wavelength band may be suppressed, the transparency thereof may be secured, and a difference in transmittance due to thermochromism in the visible light range and the infrared light range may also be maximized.

A method of manufacturing a film according to one aspect of the present disclosure may include preparing a base layer having one or more concave portions forming lines on a surface of the base layer and injecting a phase transition material into the concave portions, the phase transition material is a material of which an infrared light transmittance is changed by heat, and in the film, a transmittance $T_{550}$ for light with a wavelength of 550 nm at a temperature of 25° C. may be 57.5% or more, and an absolute value of $\Delta T_{2000}$ according to Equation 1 below may be 10% or more.

$$\Delta T_{2000} = T_{2000.L} - T_{2000.H} \quad \text{[Equation 1]}$$

In Equation 1, $T_{2000.L}$ is a transmittance of the film for light with a wavelength of 2,000 nm at a temperature of 25° C., and $T_{2000.H}$ is a transmittance of the film for light with a wavelength of 2,000 nm at a temperature of 90° C.

The base layer including one or more concave portions forming the lines on the surface thereof may be independently formed of a material having a visible light transmittance and/or transparency through a melt molding or casting molding process.

The material having the visible light transmittance and/or transparency may include, for example, one or more selected from the group consisting of cyclic olefin resin, polyimide resin, polycarbonate resin, polyamide resin, polyalkylene terephthalate resin (such as polyethylene terephthalate resin and polybutylene terephthalate resin), acrylic resin, and epoxy resin but is not limited thereto.

In this case, the base layer may be prepared so that a ratio W/P of an average width W of the concave portions to an average distance P between two lines adjacent to each other, the average width W of the concave portions, the average distance P between two lines adjacent to each other, a ratio H/W of an average height H of the concave portion to the average width W thereof, a volume (mm$^3$) of a space formed by the concave portions per unit area (1 mm$^2$) of the surface of the base layer, and a volume ratio of a volume of the phase transition material occupying the concave portion to a total volume of the concave portion may be prepared to satisfy value ranges which are equal to those of the film according to the aspect of the present disclosure.

The method of manufacturing the film according to one aspect of the present disclosure film may include the injecting of the phase transition material into the concave portions as described above. In addition, the method of manufacturing the film may additionally include curing the phase transition material injected into the cave portions.

A method of the injecting of the phase transition material into the concave portions is not particularly limited, but the phase transition material may be injected into the concave portions through a method of coating the surface of the base layer with the phase transition material.

The method of coating the surface of the base layer with the phase transition material is not particularly limited, but one of various known methods may be used. For example, the method of coating may be a method of roll coating, gravure coating, reverse coating, roll brush coating, spray coating, air knife coating, extrusion coating by a die coater, or the like, or the phase transition material may be injected thereinto using a blade. Specifically, after the phase transition material is uniformly dropped on the surface of the base layer on which the concave portions are formed using a pipette, the phase transition material may be injected into the concave portions using the blade.

Although a method of curing the phase transition material injected into the concave portions is not particularly limited, the phase transition material may be properly cured through a thermal curing method. The thermal curing method may cure the phase transition material in a short time so that the productivity may be improved.

In the case in which the phase transition material injected into the concave portions is thermally cured, a curing temperature is not particularly limited as long as the phase transition material may be cured without changing properties of the base layer. For example, the curing temperature may be 85° C. or more, 90° C. or more, 95° C. or more, or 97.5° C. or more, and in another aspect, a curing temperature may be 110° C. or less, 107.5° C. or less, 105° C. or less, or 102.5° C. or less. In addition, a curing time is not limited as long as the entire phase transition material is cured. For example, the curing time may be 3 minutes or more or 4 minutes or more, and in another aspect, a curing time may be 10 minutes or less or 7 minutes or less.

The phase transition material may include vanadium dioxide ($VO_2$) particles. An average particle size of the vanadium dioxide ($VO_2$) particles may be 40 nm or more, 42 nm or more, 44 nm or more, 46 nm or more, or 48 nm or more, and in another aspect, an average particle size thereof may be 70 nm or less, 68 nm or less, 66 nm or less, 64 nm or less, or 62 nm or less.

In a case in which vanadium dioxide ($VO_2$) particles are condensed or an average particle size thereof is large, the vanadium dioxide ($VO_2$) particles having the average particle size in the above-described range may be formed through a pulverization process. The pulverization process may be performed using, for example, a milling apparatus (for example, a twin nanoset-mill apparatus). Specifically, a slurry is prepared using the vanadium dioxide ($VO_2$) particles which are condensed or of which the average particle size is large, the slurry is mixed with metal beads and pulverized using the milling apparatus, and the metal beads are removed so that the vanadium dioxide ($VO_2$) particle slurry which satisfies the average particle size may be obtained.

The phase transition material may additionally include a polar solvent. Specifically, the phase transition material may include a thermochromic slurry including the vanadium dioxide ($VO_2$) particles and the polar solvent.

In this case, the slurry may include the vanadium dioxide ($VO_2$) particles at 5 wt % or more, 10 wt % or more, or 15 wt % or more of a total weight percentage of the slurry, and in another aspect, a slurry may include vanadium dioxide ($VO_2$) particles at 40 wt % or less, 35 wt % or less, 30 wt % or less, or 25 wt % or less of a total weight percentage of the slurry. In the case in which a content of the vanadium dioxide ($VO_2$) particles satisfies the above-described range, the film, which allows the phase transition material to be easily injected into the concave portions, satisfies a high visible light transmittance and has superior thermochromic properties for infrared light, may be manufactured.

When it is considered that the polar solvent is used with the vanadium dioxide ($VO_2$) particles, 250 parts by weight or more, 275 parts by weight or more, 300 parts by weight or more, 325 parts by weight or more, 350 parts by weight or more, 375 parts by weight or more of the polar solvent based on 100 parts by weight of the vanadium dioxide ($VO_2$) particles may be included in the thermochromic slurry, and in another aspect, 500 parts by weight or less, 475 parts by weight or less, 450 parts by weight or less, or 425 parts by weight or less of a polar solvent based on 100 parts by weight of vanadium dioxide ($VO_2$) particles may be included in a thermochromic slurry.

The polar solvent may be selected from the group containing of water and alcohol compounds, and the alcohol compounds may be, for example, methanol, ethanol, propanol, 2-butoxyethanol, or isopropyl alcohol.

In the phase transition material, the thermochromic slurry may additionally include the polar solvent, and in this case, 50 parts by weight or more, 55 parts by weight or more, 60 parts by weight or more, 65 parts by weight or more, or 70 parts by weight or more of the polar solvent based on 100 parts by weight of the thermochromic slurry may be included in the thermochromic slurry, and in another aspect, 200 parts by weight or less, 190 parts by weight or less, 180 parts by weight or less, 170 parts by weight or less, 160 parts by weight or less, or 150 parts by weight or less of a polar solvent based on 100 parts by weight of a thermochromic slurry may be included in the thermochromic slurry.

As described above, the phase transition material may additionally include a dispersion polymer as described above.

50 parts by weight or more, 55 parts by weight or more, 60 parts by weight or more, 65 parts by weight or more, 70 parts by weight, or 80 parts by weight or more of the dispersion polymer based on 100 parts by weight of the vanadium dioxide ($VO_2$) particles may be included in the phase transition material, and in another aspect, 200 parts by weight or less, 190 parts by weight or less, 180 parts by weight or less, 170 parts by weight or less, 160 parts by weight or less, or 150 parts by weight or less of a dispersion polymer based on 100 parts by weight of vanadium dioxide ($VO_2$) particles may be included in a phase transition material.

The method of manufacturing the film according to one aspect of the present disclosure may additionally include injecting a protection ink into the concave portions. In addition, the method of manufacturing the film may additionally include curing the protection ink injected into the concave portions to form the encapsulation layer.

In addition, the encapsulation layer may be formed by injecting the protection ink into the concave portions to prevent the phase transition material from being in contact with the atmosphere.

A method of injecting the protection ink into the concave portions may be the same as the above-described method of injecting the phase transition material into the concave portions.

The method of injecting the protection ink into the concave portions is not particularly limited, but the protection ink may be injected into the concave portions through a method of coating the surface of the base layer, on which the concave portions are formed, with the protection ink.

The protection ink injected into the concave portions may be cured and formed as the encapsulation layer. In this case, contents of the encapsulation layer are the same as the contents of the above-described encapsulation layer.

The protection ink may be injected into the concave portions to occupy 35% or more, 37.5% or more, 40% or more, 42.5% or more, or 45% or more of a total volume of the concave portions, or 55% or less, 52.5% or less, 50% or less, or 47.5% or less of the total volume thereof in order to protect a thermochromic layer from being oxidized and maintain a visible light transmittance.

A method of curing the protection ink injected into the concave portions is not particularly limited, but the protection ink may be properly formed as the encapsulation layer through an active energy-ray curing method. In the case in which the encapsulation layer is formed through the active energy-ray curing method, damage of the base layer and the phase transition material may be prevented. In this case, active energy-rays may be ultraviolet rays which are light with a wavelength band of 100 to 380 nm.

The protection ink may include a curable resin, and the curable resin is not particularly limited as long as a curable resin is cured by emitting the active energy-rays, but, for example, acrylic resin or urethane resin containing polyol and isocyanate compounds may be suitable as the curable resin.

In addition, the protection ink may additionally include a photoinitiator to be cured by the active energy-rays. In this case, the photoinitiator denotes a material which absorbs energy of the active energy-rays to initiate polymerization, and Irgacure 184D, which is a known photoinitiator, and the like may be used as the photoinitiator.

The protection ink may additionally include metal oxide particles for blocking ultraviolet light and maintaining a visible light transmittance. The metal oxide particles may include one or more selected from the group consisting of titanium oxide, zinc oxide, zirconium oxide, and iron oxide.

The film according to the present disclosure may be attached to a glass base and may be attached to glass facades or windows of a building to be used as a smart window. In this case, the smart window may block infrared light which increases an indoor temperature in the summer season and allow the infrared light to pass therethrough in the winter season. As described above, energy may be efficiently used using the smart window to which the film according to the present disclosure is applied.

Hereinafter, the present disclosure will be described with reference to Examples and Comparative Examples, but the present disclosure is not limited to the following contents.

Example 1

(1) Base Layer Preparation

A base layer including one or more concave portions forming lines on a surface of the base layer was prepared using polyethylene terephthalate resin. In this case, an average width of the concave portions was about 10 μm, an average distance between two lines adjacent to each other was about 2 μm, and an average height of the concave portions was about 3 μm. In addition, two or more lines formed by the concave portions were formed so that the lines did not intersect each other.

(2) Phase Transition Material Preparation A purchased commercial vanadium dioxide ($VO_2$) powder (Supplier: FUNCMATER, Average Particle Size: 200 to 300 nm, Monoclinic) was pulverized using a milling apparatus (Supplier: DNTEK Co., Ltd, twin nanoset-mill, Model Name: TNS050). Specifically, a vanadium dioxide ($VO_2$) slurry was prepared by mixing and sufficiently dispersing 100 parts by weight of the commercial vanadium dioxide ($VO_2$) powder with 400 parts by weight of distilled water. Then, 400 parts by weight of zirconia beads having an average diameter of 0.1 mm based on 100 parts by weight of the vanadium dioxide ($VO_2$) slurry were mixed with the vanadium dioxide ($VO_2$) slurry and rotated at 4,000 to 4,500 rpm for 180 minutes to pulverize the vanadium dioxide ($VO_2$) powder. The rotation and pulverization process was repeated about 70 times, and the mixed zirconia beads were removed to obtain the pulverized vanadium dioxide ($VO_2$) slurry.

100 parts by weight of polyvinylpyrrolidone (PVP, Supplier: Sigma-Aldrich) and 900 parts by weight of ethanol were mixed to prepare a mixture. The mixture and the pulverized vanadium dioxide ($VO_2$) slurry were mixed so that a weight ratio was 1:1, and a final phase transition material was obtained. An ultrasonic treatment was additionally performed on the phase transition material to increase the dispersibility of the vanadium dioxide ($VO_2$) particles.

The phase transition material was put in a pipette, uniformly dropped on one surface of the base layer in which the concave portions were formed, and then applied on the entire surface using a blade. In this case, the phase transition material was injected into the concave portions to occupy a volume ratio of 13.33% to a total volume of the concave portions.

The phase transition material applied on portions which were not the concave portions was removed by dry cleaning using a dustless cloth. Then, the phase transition material in the concave portions was repeatedly cured three times thermally at a temperature of 100° C. for about 5 minutes so that a film was obtained.

Example 2

A film was obtained through the same method as Example 1 except that a base layer was prepared so that an average width of concave portions was about 10 μm, an average distance between two lines adjacent to each other was about 3.33 μm, and an average height of the concave portions was about 3 μm.

Comparative Example 1

A polyethylene terephthalate resin film on which concave portions were not formed were prepared. In addition, a phase transition material obtained through the same method as Example 1 was applied on an entirety of the resin film and thermally cured through the same method as Example 1 so that a film is obtained.

Comparative Example 2

A film was obtained through the same method as Example 1 except that a base layer was prepared so that an average width of concave portions was about 10 μm, an average distance between two lines adjacent to each other was about 10 μm, and an average height of the concave portions was about 3 μm.

Comparative Example 3

A film was obtained through the same method as Example 1 except that a base layer was prepared so that an average width of concave portions was about 10 μm, an average distance between two lines adjacent to each other was about 1.43 μm, and an average height of the concave portions was about 3 μm.

Example 3

A film was obtained through the same method as Example 1 except that a phase transition material was injected into concave portions to occupy the concave portions at a volume ratio of 6.66% to a total volume of the concave portions.

Comparative Example 4

A film was obtained through the same method as Example 1 except that a phase transition material was injected into concave portions to occupy the concave portions at a volume ratio of 1.67% to a total volume of the concave portions.

Comparative Example 5

A film was obtained through the same method as Example 1 except that a phase transition material was injected into concave portions to occupy the concave portions at a volume ratio of 20% to a total volume of the concave portions.

Comparative Example 6

A film was obtained through the same method as Example 1 except that a phase transition material was injected into concave portions to occupy the concave portions at a volume ratio of 33.33% to a total volume of the concave portions.

Example 4

A protection ink was injected into the concave portions of the film obtained in Example 1.

The protection ink was prepared by mixing 100 parts by weight of urethane acrylate oligomer (Supplier: Miwon Commercial Co., Ltd., Product Name: Miramer PU210, Weight-average Molecular Weight: 5,000 mol/g, PDI: 1.2) which was a curable resin with 10 parts by weight of irgacure 184D (Supplier: Ciba Geigy Corp.) which was a photoinitiator.

The protection ink was put in a pipette, uniformly dropped on one surface of a base layer in which the concave portions were formed, and then applied on the entire surface using a blade. In this case, the protection ink was injected into the concave portions so that the encapsulation layer, which would be formed, occupied the concave portions at a volume ratio of 46.7% to a total volume of the concave portions.

Then, the protection ink applied on portions which were not the concave portions was removed by dry cleaning using a dustless cloth. In addition, a mercury lamp of 1.2 kW emitted light with a wavelength band of about 250 nm for 300 seconds to the protection ink so that the film additionally including the encapsulation layer was obtained.

Comparative Example 7

A film was obtained through the same method as Example 4 except that a protection ink was injected into concave portions so that a volume ratio to be formed of a volume of an encapsulation layer to a total volume of concave portions is 21.6%.

Comparative Example 8

A film was obtained through the same method as Example 4 except that a protection ink was injected into concave portions so that a volume ratio to be formed of a volume of an encapsulation layer to a total volume of concave portions is 33.3%.

Comparative Example 9

A film was obtained through the same method as Example 4 except that a protection ink was injected into concave portions so that a volume ratio to be formed of a volume of an encapsulation layer to a total volume of concave portions is 60%.

Comparative Example 10

A film was obtained through the same method as Example 4 except that a protection ink was injected into concave portions so that a volume ratio to be formed of a volume of an encapsulation layer to a total volume of concave portions is 70%.

<Physical Property Measurement Method and Measurement Result>

1. Method of Measuring Transmittance in Visible Light Range and Method of Measuring Transmittance Difference due to Thermochromism in Infrared Light Range (1) Method of Measuring Transmittance in Visible Light Range Just after being produced, a film was placed in an environment in which there was no light and UV-VIS-NIR spectrometer (Supplier: JASCO Corporation, Model Name: V-670) was used at a temperature of 25° C. A transmittance was measured according to a light extinction method in which light with a wavelength of 550 nm was allowed to pass through an optical sheet and a reduced amount of light was measured.

In addition, after leaving the film in room temperature and humidity environment for 30 days or 60 days from a date of production thereof, the transmittance of the visible light range was measured through a method which is the same as the above-described method.

(2) Method of Measuring Transmittance Difference due to Thermochromism in Infrared Light Range Just after being produced, a film was placed in an environment in which there was no light and UV-VIS-NIR spectrometer (Supplier: Jasco company, Model Name: V-670) was used. A transmittance was measured according to the light extinction method in which light with a wavelength of 2,000 nm was allowed to pass through the optical sheet and a reduced amount of light was measured. In this case, when one was (a) transmittance $T_{2000,L}$ measured at a temperature of 25° C., and another was (b) transmittance $T_{2000,H}$ measured at a temperature of 90° C., an absolute value of a difference between (a) transmittance $T_{2000,L}$ and (b) transmittance $T_{2000,H}$ was calculated.

In addition, after leaving the film for 30 days or 60 days from a date of production thereof, a difference in transmittance due to thermochromism in infrared light range was measured.

2. Measurement Result A transmittance in visible light range and a difference in transmittance due to thermochromism in an infrared light range of the film are summarized in the following Tables 1 to 3 according to the Examples and the Comparative Examples.

TABLE 1

| Classification | $T_{550} = T_{550,B}$ | $T_{550,A}$ (after 30 Days) | $\Delta T_{2000} = \Delta T_{2000,B}$ | $\Delta T_{2000,A}$ (after 30 Days) |
|---|---|---|---|---|
| Example 1 | 61.1% | 59.8% | 25.4% | 23.9% |
| Example 2 | 67.3% | 66.2% | 18.6% | 17.4% |
| Comparative Example 1 | 55.3% | 53.1% | 27.9% | 24.4% |
| Comparative Example 2 | 73.4% | 72.9% | 9.3% | 8.8% |
| Comparative Example 3 | 54.3% | 52.3% | 27.7% | 25.1% |

Referring to Table 1, in each of Examples 1 and 2, a transmittance of visible light range was 57.5% or more, and a difference in transmittance due to thermochromism in the infrared light range was 10% or more. In addition, in Examples 1 and 2, absolute values of $\Delta TA_{550,30}$ were 1.3% and 1.1%, respectively, and absolute values of $\Delta TA_{2000,30}$ were 1.5% and 1.2%, respectively. In addition, in each of Examples 1 and 2, the sum of a transmittance $T_{550}$ for light with a wavelength of 550 nm at a temperature of 25° C. and $\Delta T_{2000}$ according to Equation 1 was 60% or more.

However, in each of Comparative Examples 1 and 3, a transmittance in visible light range did not reach 57.5%, and in Comparative Example 2, a difference in transmittance due to thermochromism in infrared light range did not reach 10%.

In addition, in Comparative Example 1, an absolute value of $\Delta TA_{550,30}$ was 2.2% which was higher than 1.5%, and an absolute value of $\Delta TA_{2000,30}$ was 3.5% which was higher than 2%. In Comparative Example 3, an absolute value of $\Delta TA_{550,30}$ was 2% which was higher than 1.5%, and an absolute value of $\Delta TA_{2000,30}$ was 2.6% which was higher than 2%.

TABLE 2

| Classification | $T_{550}$ | $\Delta T_{2000}$ |
|---|---|---|
| Example 1 | 61.1% | 25.4% |
| Example 3 | 70.8% | 14.1% |
| Comparative Example 4 | 79.3% | 4.3% |
| Comparative Example 5 | 49.4% | 24.9% |
| Comparative Example 6 | 35.2% | 18.5% |

Referring to Table 2, in each of Examples 1 and 3, a transmittance in a visible light range was 57.5% or more, and a difference in transmittance due to thermochromism in infrared light range was 10% or more.

However, in each of Comparative Examples 5 and 6, a transmittance in a visible light range did not reach 57.5%, and in Comparative Example 4, a difference in transmittance due to thermochromism in an infrared light range did not reach 10%. In addition, in Comparative Example 6, since the sum of a transmittance $T_{550}$ for light with a wavelength of 550 nm at a temperature of 25° C. and $\Delta T_{2000}$ according to Equation 1 was 53.7%, the sum did not reach 60%.

TABLE 3

| Classification | $T_{550} = T_{550,D}$ | $T_{550,C}$ (after 60 Days) | $\Delta T_{2000} = \Delta T_{2000,D}$ | $\Delta T_{2000,C}$ (after 60 Days) |
|---|---|---|---|---|
| Example 4 | 57.7% | 57.6% | 24.6% | 24.6% |
| Comparative Example 7 | 59.9% | 59.1% | 24.9% | 24.5% |
| Comparative Example 8 | 58.7% | 58.1% | 24.7% | 24.5% |
| Comparative Example 9 | 56.4% | 56.3% | 24.2% | 24.1% |
| Comparative Example 10 | 55.1% | 55.1% | 23.9% | 23.9% |

Referring to Table 3, in Example 4, a transmittance for light with a wavelength of 550 nm was 57.5% or more, and a difference in transmittance due to thermochromism for light with a wavelength of 2,000 nm satisfied 10% or more. In addition, in Example 4, an absolute value of $\Delta TA_{550,60}$ was 0.5% or less, and an absolute value of $\Delta TA_{2000,60}$ satisfied 0.3% or less.

However, in Comparative Example 7, an absolute value of $\Delta TA_{2000,60}$ was greater than 0.3%.

In addition, in each of Comparative Examples 7 and 8, an absolute value of $\Delta TA_{550,60}$ was greater than 0.5%.

In addition, in each of Comparative Examples 9 and 10, a transmittance for light with a wavelength of 550 nm was less than 57.5%.

A film and a smart window including the same according to the present disclosure has a high visible light transmittance as well as superior thermochromic properties.

In the film and the smart window including the same, since an entire surface is not coated with a phase transition material but a pattern form is provided, a color thereof is not cloudy but bright so that the film and the smart window including the same are aesthetically good.

The film and the smart window including the same can be mass-produced and have predetermined thermochromic properties.

What is claimed is:

1. A film comprising:
   a base layer including one or more concave portions forming lines on a surface of the base layer; and
   a phase transition material which is present in the one or more concave portions of the base layer,
   wherein the phase transition material is a material of which an infrared light transmittance is changed by heat,
   a transmittance $T_{550}$ for light with a wavelength of 550 nm at a temperature of 25° C. is 57.5% or more, and
   an absolute value of $\Delta T_{2000}$ according to Equation 1 below is 10% or more:

$$\Delta T_{2000} = T_{2000,L} - T_{2000,H}, \quad \text{[Equation 1]}$$

in Equation 1, $T_{2000,L}$ is a transmittance of the film for light with a wavelength of 2,000 nm at a temperature of 25° C., and $T_{2000,H}$ is a transmittance of the film for light with a wavelength of 2,000 nm at a temperature of 90° C.,
   an absolute value of $\Delta TA_{550,30}$ according to Equation 3 below is 1.5% or less, and
   an absolute value of $\Delta TA_{2000,30}$ according to Equation 4 below is 2% or less:

$$\Delta TA_{550,30} = T_{550,A} - T_{550,B}, \quad \text{[Equation 3]}$$

in Equation 3, $T_{550,A}$ is a transmittance of the film for light with a wavelength of 550 nm at a temperature of 25° C. after the film is maintained for 30 days in an ambient condition at a temperature of 25° C., and $T_{550,B}$ is a transmittance of the film for light with a wavelength of 550 nm at a temperature of 25° C. before the film is maintained for 30 days in the ambient condition at a temperature of 25° C.;

$$\Delta TA_{2000,30} = \Delta T_{2000,A} - \Delta T_{2000,B}, \quad \text{[Equation 4]}$$

in Equation 4, $\Delta T_{2000,A}$ is an absolute value of $\Delta T_{2000}$ calculated according to Equation 1 above after the film is maintained for 30 days in the ambient condition at a temperature of 25° C., and $\Delta T_{2000,B}$ is an absolute value of $\Delta T_{2000}$ calculated according to Equation 1 above before the film is maintained for 30 days in the ambient condition of the temperature of 25° C.

2. The film of claim 1, wherein the sum of the transmittance $T_{550}$ for light with a wavelength of 550 nm at a temperature of 25° C. and $\Delta T_{2000}$ according to Equation 1 is 60% or more.

3. The film of claim 1, wherein an absolute value of $\Delta T_{550}$ according to Equation 2 below is 5% or less:

$$\Delta T_{550} = T_{550,L} - T_{550,H}, \quad \text{[Equation 2]}$$

in Equation 2, $T_{550,L}$ is a transmittance of the film for light with a wavelength of 550 nm at a temperature of 25° C., and $T_{550,H}$ is a transmittance of the film for light with a wavelength of 550 nm at a temperature of 90° C.

4. The film of claim 1, wherein the concave portions form a pattern in which two or more lines are formed on the surface of the base layer.

5. The film of claim 4, wherein a ratio (W/P) of an average width (W) of the concave portions to an average distance (P) between two lines adjacent to each other is in the range of 1.5 to 6.5.

6. The film of claim 4, wherein an average distance (P) between the two lines adjacent to each other is in the range of 1 to 10 μm.

7. The film of claim 4, wherein the two or more lines formed by the concave portions are formed to not intersect each other.

8. The film of claim 1, wherein an average width of the concave portions is in the range of 10 to 20 μm.

9. The film of claim 1, wherein an average height of the concave portions is in the range of 1 to 10 μm.

10. The film of claim 1, wherein a ratio (H/W) of an average height (H) to an average width (W) of the concave portions is in the range of 0.8 to 5.

11. The film of claim 1, wherein a volume (mm$^3$) of a space formed by the concave portions per unit area (1 mm$^2$) of the surface of the base layer is in the range of $5 \times 10^4$ to $1 \times 10^{-2}$ mm$^3$.

12. The film of claim 1, wherein the phase transition material includes vanadium dioxide (VO$_2$).

13. The film of claim 12, wherein an average particle size of the vanadium dioxide (VO$_2$) is in the range of 40 to 70 nm.

14. The film of claim 1, wherein a ratio of a volume of the phase transition material occupying the concave portions to a total volume of the concave portions is in the range of 5 to 18%.

15. The film of claim 1, further comprising an encapsulation layer preventing the phase transition material from being in contact with the atmosphere in the concave portions.

16. The film of claim 15, wherein an absolute value of $\Delta TA_{550,60}$ according to Equation 5 below is 0.5% or less, and
   an absolute value of $\Delta TA_{2000,60}$ according to Equation 6 below is 0.3% or less:

$$\Delta TA_{550,60} = T_{550,C} - T_{550,D}, \quad \text{[Equation 5]}$$

in Equation 5, $T_{550,C}$ is a transmittance of the film for light with a wavelength of 550 nm at a temperature of 25° C. after the film is maintained for 60 days in an ambient condition at a temperature of 25° C., and $T_{550,D}$ is a transmittance of the film for light with a wavelength of 550 nm at a temperature of 25° C. before the film is maintained for 60 days in the ambient condition at a temperature of 25° C.;

$$\Delta TA_{2000,60} = \Delta T_{2000,C} - \Delta T_{2000,D}, \quad \text{[Equation 6]}$$

in Equation 6, $\Delta T_{2000,C}$ is an absolute value of $\Delta T_{2000}$ calculated according to Equation 1 below after the film is maintained for 60 days in the ambient condition at a temperature of 25° C., and $\Delta T_{2000,D}$ is an absolute value of $\Delta T_{2000}$ calculated according to Equation 1 below before the film is maintained for 60 days in the ambient condition at a temperature of 25° C.; and $$\Delta T_{2000} = T_{2000,L} - T_{2000,H}, \quad \text{[Equation 1]}$$

in Equation 1, $T_{2000,L}$ is a transmittance of the film for light with a wavelength of 2,000 nm at a temperature of 25° C., and $T_{2000,H}$ is a transmittance of the film for light with a wavelength of 2,000 nm at a temperature of 90° C.

17. The film of claim 15, wherein a ratio of a volume of an encapsulation layer occupying the concave portions to a total volume of the concave portions is in the range of 35 to 55%.

18. The film of claim 15, wherein the encapsulation layer includes metal oxide particles.

19. A smart window comprising a glass base and the film of claim 1.

* * * * *